United States Patent
Giraud et al.

(10) Patent No.: US 9,547,367 B2
(45) Date of Patent: Jan. 17, 2017

(54) TRANSPARENT VIBRATING TOUCH INTERFACE

(75) Inventors: Frédéric Giraud, Marcq en Baroeul (FR); Michel Amberg, Villeneuve D'ascq (FR); Betty Lemaire-Semail, Lille (FR)

(73) Assignee: Universite Lille 1-Sciences Et Technologies, Villeneuve D'ascq (FR)

( * ) Notice: Subject to any disclaimer, the term of this patent is extended or adjusted under 35 U.S.C. 154(b) by 0 days.

(21) Appl. No.: 14/116,479

(22) PCT Filed: May 9, 2012

(86) PCT No.: PCT/FR2012/051018
§ 371 (c)(1),
(2), (4) Date: Nov. 8, 2013

(87) PCT Pub. No.: WO2012/153061
PCT Pub. Date: Nov. 15, 2012

(65) Prior Publication Data
US 2014/0327839 A1    Nov. 6, 2014

(30) Foreign Application Priority Data
May 9, 2011  (FR) ...................................... 11 53963

(51) Int. Cl.
*G06F 3/01* (2006.01)
*G06F 3/041* (2006.01)

(52) U.S. Cl.
CPC ............. *G06F 3/016* (2013.01); *G06F 3/0412* (2013.01)

(58) Field of Classification Search
CPC .... G06F 3/016; G06F 3/041; G06F 2203/014; G06F 3/03547; G06F 2203/013
(Continued)

(56) References Cited

U.S. PATENT DOCUMENTS 8,232,976 B2 * 7/2012 Yun .......................... G06F 3/016
345/156
2005/0248547 A1 11/2005 Kent
(Continued)

FOREIGN PATENT DOCUMENTS

EP    1 956 466    8/2008
JP    2006165318 A    6/2006
(Continued)

OTHER PUBLICATIONS

European Patent Office; Search Report and Written Opinion in International Patent Application No. PCT/FR2012/051018 dated Aug. 21, 2012; 10 pages.
(Continued)

*Primary Examiner* — Hong Zhou
(74) *Attorney, Agent, or Firm* — Wood Herron & Evans LLP

(57) ABSTRACT

The The invention relates to a touch interface comprising a contact surface and means for vibrating the contact surface, said means being provided to generate standing waves in said surface. The contact surface includes at least one transparent portion forming a surface for seeing through the touch interface, and the vibration generating means include at least one rigid piezoelectric layer that is rigidly connected to the contact surface and disposed on the periphery of the transparent portion. The interface is characterized in that the at least one piezoelectric layer is disposed in a plane that is not parallel to the contact surface. The invention also relates to a display screen using such an interface, and to an electric appliance using such a display screen.

19 Claims, 2 Drawing Sheets

(58) Field of Classification Search
USPC .................. 345/173–179; 178/18.01–20.01; 715/701–702
See application file for complete search history.

(56) References Cited

U.S. PATENT DOCUMENTS

| | | | |
|---|---|---|---|
| 2008/0007532 A1* | 1/2008 | Chen ............................. | 345/173 |
| 2008/0132313 A1* | 6/2008 | Rasmussen ............. | G07F 17/32 463/16 |
| 2009/0115734 A1* | 5/2009 | Fredriksson et al. ......... | 345/173 |
| 2009/0284485 A1 | 11/2009 | Colgate | |
| 2010/0225596 A1* | 9/2010 | Eldering ....................... | 345/173 |
| 2011/0115734 A1* | 5/2011 | Harashima et al. .......... | 345/173 |
| 2011/0310028 A1* | 12/2011 | Camp et al. .................. | 345/173 |
| 2012/0242593 A1* | 9/2012 | Kim et al. ..................... | 345/173 |

FOREIGN PATENT DOCUMENTS

| | | |
|---|---|---|
| JP | 2006198473 A | 8/2006 |
| WO | 2008/116980 A1 | 10/2008 |

OTHER PUBLICATIONS

Hiroyuki Kotaino et al.; "Glass Substrate Surface Acoustic Wave Tactile Display With Visual Information" dated Jun. 1, 2006; 6 pages.
French Patent Office; Search Report in French Patent Application No. 1153963 dated Nov. 28, 2011; 2 pages.
Chinese Patent Office; Office Action in Chinese Patent Application No. 2014-509794 dated Mar. 29, 2016; 2 pages.

\* cited by examiner

TRANSPARENT VIBRATING TOUCH INTERFACE

The present invention relates to a touch interface implementing a vibrating contact surface being able to be used in a display screen, as well as a display screen implementing such an interface.

The field of the invention is the field of vibrating touch interfaces for a display screen and more particularly interfaces for a display screen making it possible to reproduce textures or surface roughness by tactile means via a contact surface and means for generating vibrations in the contact surface.

Currently different vibrating touch interfaces exist. Certain touch interfaces exploit a physical principle which allows control of the coefficient of friction felt: a vibration is created within a plate constituting a contact surface, at ultrasonic frequency, with a micrometric amplitude. When the finger touches the vibrating plate, an "air cushion" (Squeeze film or overpressure zone) develops between the plate and the finger, thus reducing the coefficient of friction between the finger and the plate. The reduction in the coefficient of friction is a function of the amplitude of the vibration generated. In order to generate this vibration, piezoelectric ceramics are used.

A first category of vibrating touch interfaces such as the touch interface described in European patent application EP 1 956 466 filed by the Applicant are known. This interface comprises a contact surface and a layer of transducers causing the contact surface to vibrate with stationary waves and more particularly with Lamb waves. The contact surface is constituted by one of the surfaces of a plate and the layer of transducers is deposited on the surface opposite to this plate. Such an interface cannot be used in a touch display screen.

Other vibrating touch interfaces exist which can be used in display screens such as the vibrating touch interface described in the patent application US 2009/0284485. This interface is constituted by a transparent contact surface, for example a glass plate surface, and ultrasonic transducers deposited on the contact surface. A portion of the contact surface allows visual observation of an object through the contact surface and therefore can be used in a touch display screen of an electronic device.

However, in the touch interface of document US2009/0284485, the contact surface cannot be used entirely for viewing objects through the touch surface. In other words, in order to use the touch interface of this document in a display screen it is necessary to use a contact surface which is larger than the display screen or a display screen which is smaller than the contact surface. The contact plate, which serves as the contact surface, therefore occupies more space than the surface which can be used for the display.

A purpose of the invention is to propose a vibrating touch interface for display screen having a larger contact surface which can be used for the display than the known vibrating touch interfaces, with respect to the total surface area occupied by the contact plate.

Another purpose of the present invention is to propose a vibrating touch interface in which all of the contact surface area can be used for the display.

The invention allows these aims to be achieved by a touch interface comprising a contact surface and means of vibrating said contact surface provided for generating stationary waves in said contact surface:

said contact surface comprises at least one transparent portion forming an observation surface through said touch interface, and said vibration means comprise at least one rigid piezoelectric layer, firmly fixed to said contact surface and arranged on the periphery of said transparent portion; and said interface being characterized in that said at least one piezoelectric layer is arranged in a plane non parallel to the contact surface, i.e. having a non zero angle with the contact surface.

In the interface according to the invention, at least one piezoelectric layer is arranged in a plane non parallel to the contact surface while being firmly fixed to said contact surface. The at least one piezoelectric layer therefore occupies less space than its width on the contact surface, which then has a larger surface area which can be used for the display, with respect to the total contact surface area.

This is why the interface according to the invention has a larger contact surface which can be used for the display compared to the known vibrating touch interfaces, with respect to the total surface area occupied by the contact plate. Moreover, with the interface according to the invention all of the contact surface can be used for the display.

According to the invention, at least one piezoelectric layer can be arranged in a plane having an angle comprised between 45° and 90° to the contact surface.

According to a preferred version, at least one piezoelectric layer is arranged in a plane perpendicular to the contact surface. This configuration makes it possible to have the largest size of transparent contact surface which can be used for the display without increasing the total space requirement. In fact, in this configuration, the at least one piezoelectric layer occupies no space, or very little space, on the contact surface, which then has a larger surface area which can be used for the display, with respect to the total contact surface area.

According to the invention each piezoelectric layer is arranged so as to generate, in said contact surface, stationary surface acoustic waves called Lamb or Rayleigh waves, and more particularly Lamb waves of the order of a few tens of kHz.

The interface according to the invention can comprise several rigid piezoelectric layers, firmly fixed to said contact surface, each being arranged in one or more planes non parallel to the contact surface, more particularly in one or more planes each having an angle comprised between 45° and 90°, and preferentially in one or more planes perpendicular to the contact surface.

In this case, at least two of the layers can be arranged on the same side of the contact surface. At least two layers can also be arranged on either side of the contact surface, in other words on two opposite sides.

Similarly, at least two layers can be arranged in the same plane.

Moreover, at least two layers can be arranged in two planes parallel to each other, or in two planes perpendicular to each other.

All these examples and embodiments are of course compatible with each other.

In a particular embodiment example which is in no way limitative of the interface according to the invention:

the contact surface is made by a plate, called a contact plate, and at least one piezoelectric layer comprises a rigid plate, called a support plate.

In this case, according to a first option, at least one support plate can be arranged on the edge of the contact plate. More particularly, the support plate can be arranged on the contact plate so that the support plate projects towards only a side of the contact plate.

According to a second option, at least one support plate can be arranged on the contact plate by one of its slices.

The interface according to the invention can for example comprise several piezoelectric layers, at least one produced according to the first option and another according to the second option.

In any case, the support plate and the contact plate can be assembled by any suitable means, for example by bonding.

According to a particular embodiment example, at least one support plate can be made from copper or an alloy based on copper. The copper is a good resonator, i.e. it has a good quality coefficient. Moreover, the piezoelectric cells, for example made from ceramics, are easily bonded to copper, and this is a conductive material. Moreover, copper is easily machinable.

A copper alloy has an even better performance.

According to other embodiment examples, the support plate can be made from aluminium or steel.

According to an embodiment example of the interface according to the invention, the contact surface has a parallelepiped shape. The interface comprises two piezoelectric layers arranged on the two opposite sides of the parallelepiped shape.

More particularly, the two piezoelectric layers can be arranged on the two opposite sides having the shortest length.

At least one piezoelectric layer can comprise a row of at least two piezoelectric cells.

When the piezoelectric layer comprises a support plate, at least one piezoelectric cell can be glued on the support plate, for example with a cyano-acrylate glue or any other glue that polymerizes at a high temperature such as an epoxide glue.

Advantageously, the contact surface can be made from transparent glass, rigid transparent plastic, polycarbonate, Plexiglas, or any combination of at least two of these transparent materials, or more generally one or more transparent materials with a good quality coefficient or a low damping ratio.

The contact surface is preferably entirely transparent.

The means of vibrating the surface can moreover comprise means of electrical supply connected to each of the piezoelectric layers.

Advantageously, the interface according to the invention can moreover comprise means for sensing a position, a speed, an acceleration and/or a force or a pressure applied by a finger of a user or a pointer or any combination of at least two of these variables.

The interface according to the invention can advantageously comprise means for controlling and varying an amplitude, a phase and/or a frequency of the electrical supply delivered by the electrical supply means or any combination of at least two of these variables.

According to another aspect of the invention a touch display screen is proposed for an electronic device comprising a touch interface according to the invention and a graphical display screen viewed through said transparent portion. The graphical display screen can be an LCD screen, a plasma screen or any other display screen.

Also according to another aspect of the invention an electronic device is proposed comprising a touch display screen according to the invention. Such device can be, for example a mobile phone, a digital tablet, an electronic games device or a device for storing and/or listening to multimedia content.

Other advantages and characteristics will become apparent on examination of the detailed description of embodiments which are in no way limitative, and the attached diagrams, in which.

Figure 1:
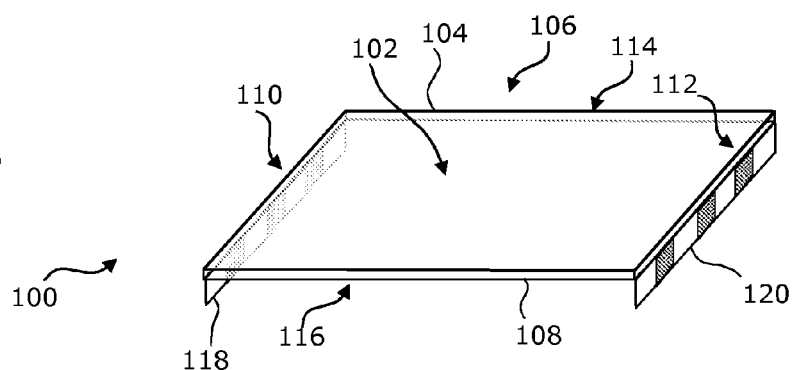
FIGS. 1 to 4 are diagrammatic representations of several embodiments of an interface according to the invention.

In the figures, an element appearing in several figures retains the same reference.

FIGS. 1 to 4 are diagrammatic representations of four embodiments 100-400 of an interface according to the invention.

In each of the embodiments 100-400, the interface comprises an entirely transparent contact surface 102 constituted by one of the surfaces, for example the upper surface 104, of a plate 106, called contact, produced in a transparent material such as glass. The glass plate 106 comprises a lower surface 108 opposite to the upper surface.

In the non limitative examples represented in FIGS. 1 to 4, the glass plate 106 is in the form of a rectangle and has a thickness of 0.9 mm. The shortest sides are the sides 110 and 112 and measure 59 mm and the longest sides are the sides 114 and 116 and measure 83 mm.

In the embodiment represented in FIG. 1, the interface 100 comprises two piezoelectric layers 118 and 120 arranged on opposite sides 110 and 112 having the shortest lengths, perpendicular to the contact surface 102. The two piezoelectric layers 118 and 120 project from the same side of the contact plate 106 namely from the side of the lower surface 108.

Figure 2:
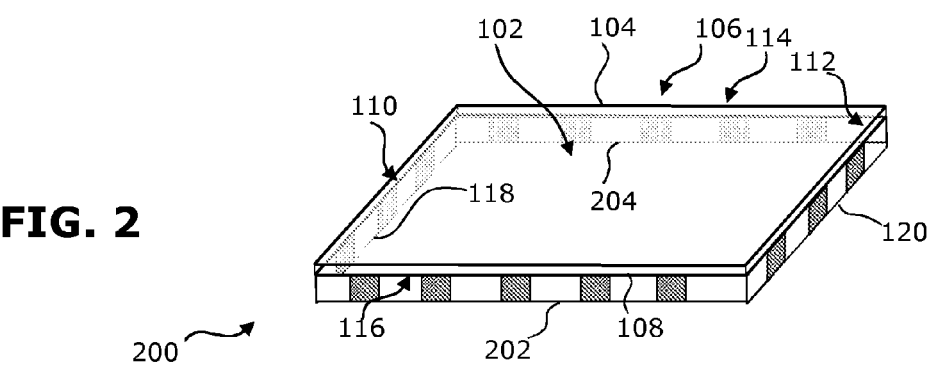

In the embodiment represented in FIG. 2, the interface 200 comprises two piezoelectric layers 118 and 120 arranged on opposite sides 110 and 112 having the shortest lengths, perpendicular to the contact surface 102. The interface 200 comprises moreover two further piezoelectric layers 202 and 204 arranged on opposite sides 116 and 114 having the longest lengths, still perpendicular to the contact surface 102. The four piezoelectric layers 118 and 120, and 202 and 204 project from the same side of the contact plate 106 namely from the side of the surface lower 108. In other words, the layers 118 and 120 are parallel to each other, perpendicular to each of the layers 202 and 204, and each of the layers 118, 120, 202 and 204 is perpendicular to the contact surface 102.

Figure 3:
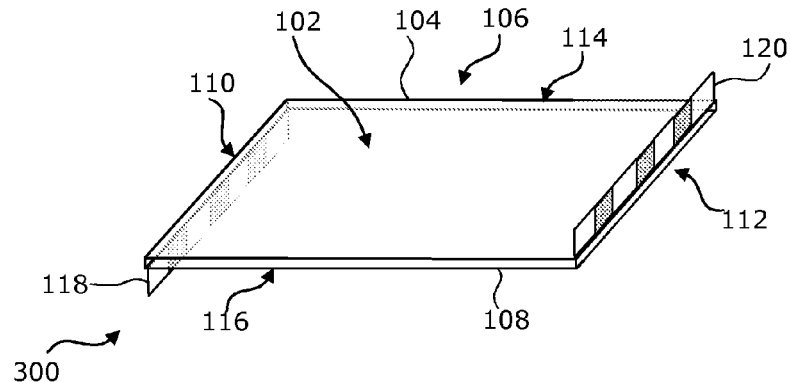

In the embodiment represented in FIG. 3, the interface 300 comprises two piezoelectric layers 118 and 120 arranged on opposite sides 110 and 112 having the shortest lengths, perpendicular to the contact surface 102. However, one of the piezoelectric layers, namely the layer 118 projects from the side of the lower surface 108 of the plate 106 while the other piezoelectric layer, namely the layer 120, projects from the side of the upper surface 106 of the plate 106, i.e. the contact surface. In other words, the piezoelectric layers 118 and 120 are perpendicular to the contact surface 102, one projecting, extending or protruding from the contact surface 102 on one side of this surface 102 and the other on the opposite side.

Figure 4:
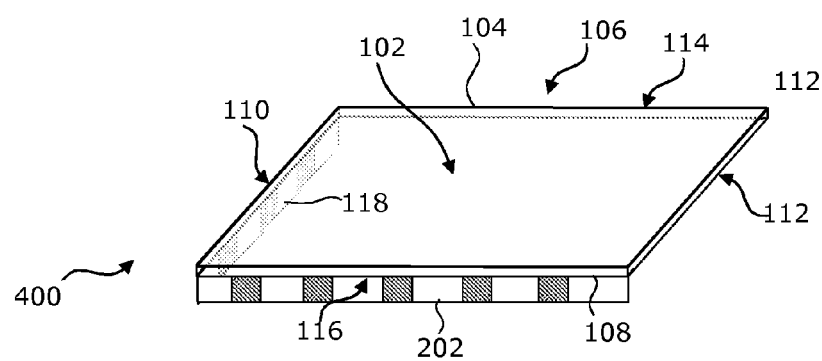

In the embodiment represented in FIG. 4, the interface 400 comprises a piezoelectric layer 118 arranged on one of the sides of the plate 106 having the shortest length, namely the side 110, perpendicular to the contact surface 102. The interface 400 comprises moreover another piezoelectric layer 202 arranged on one of the sides of the plate having the longest length, namely the side 116, still perpendicular to the contact surface 102. The two piezoelectric layers 118 and 202 project from the same side of the contact plate 106 namely from the side of the lower surface 108, i.e. the surface opposite to the contact surface 102. Moreover, the layers 118 and 202 are perpendicular to each other and to the contact surface 102.

Figure 5:
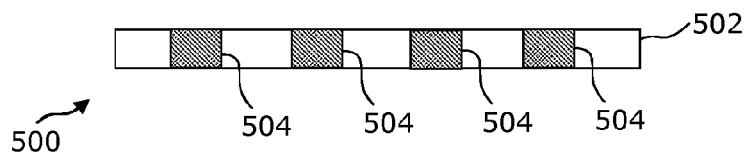
FIG. 5 is a diagrammatic representation of a piezoelectric layer implemented in the interface according to the invention.

In the non limitative examples described with reference to FIGS. 1 to 4, each piezoelectric layer is composed of a copper plate 502, called support, on which several piezoelectric cells 504 are arranged as represented in FIG. 5. Each piezoelectric cell can be bonded onto the support plate using a cyano-acrylate glue or any other glue that polymerizes at high temperature such as an epoxide glue. According to an embodiment example, the dimensions of the plate are 0.9 mm×59 mm×83 mm.

Figure 6:
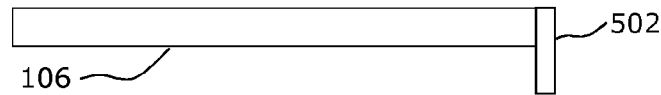
FIGS. 6 and 7 are diagrammatic representations of methods of attachment of a support plate to a contact plate.
Figure 7:
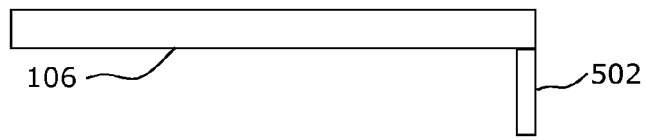

Each piezoelectric layer can be arranged on the contact plate according to at least one of the two configurations represented in FIGS. 6 and 7.

In the configuration represented in FIG. 6, the support plate 502 is arranged on/against an edge of the contact plate 106. This configuration has the advantage of being able to use the whole contact surface for display. In fact, in this configuration, the contact plate does not interfere with observation through the contact plate 106 over the whole contact surface.

In the configuration represented in FIG. 7, the support plate 502 is arranged on the contact plate 106 by one of its edges. This configuration has the advantage of obtaining a more robust construction.

Even if, in this configuration, the contact plate is located in the direction of observation through the contact surface, its thickness being very thin, the surface lost for display is also very low.

Whatever the configuration chosen, the support plate can be arranged on the contact plate by bonding for example by using a cyano-acrylate glue, or any other glue that polymerizes at high temperature such as an epoxide glue.

In the invention, the piezoelectric cells are no longer bonded under the vibrating plate and, moreover, the excitation of this vibrating plate is carried out with two nodes of the wave, even advantageously a line of nodes. At this level, on these nodes, the piezoelectric cells make it possible to apply a moment of motive power. In the examples given, the nodes chosen are the nodes situated on the edges of the vibrating plate, but it is possible to excite the plate from other nodes by means of adapting certain other parameters such as the size of the transparent plate, its thickness and the length of the support plate(s).

In the examples given, the contact plate used is a copper plate, but other materials are possible, if necessary by means of adapting the dimensions of this plate, and more precisely the length and thickness of the support plate, the purpose being to retain the suitability of the support plate for the contact plate in terms of resonance frequency.

Moreover, in the examples represented, the piezoelectric cells are only shown on one face of the support plate. It is possible, according to the invention, to arrange piezoelectric cells on both faces, for example in order to obtain a greater amplitude of vibration of the contact surface with a same number of cells.

In the examples represented, the edges of the different plates have been represented as having right angles, but these edges can have other profiles such as edges in which the support plate and the contact plate have complementary profiles, or which are chamfered, provided that the assembly makes it possible to transmit a torque rather than a simple unidirectional force and that the support plate is arranged on the contact plate following a neutral line of vibration, also called nodes. In order to identify the position of the lines of nodes, it is possible to carry out a simulation to obtain the modal analysis of the mechanical assembly and on that basis to find the position of the lines of nodes.

In fact, in the present invention, the excitation of the contact plate, and as a result of the contact surface, by the support plate(s) is carried out by a line of nodes. The European patent application EP 1 956 466 gives more details on the lines of nodes well known to a person skilled in the art.

Figure 8:
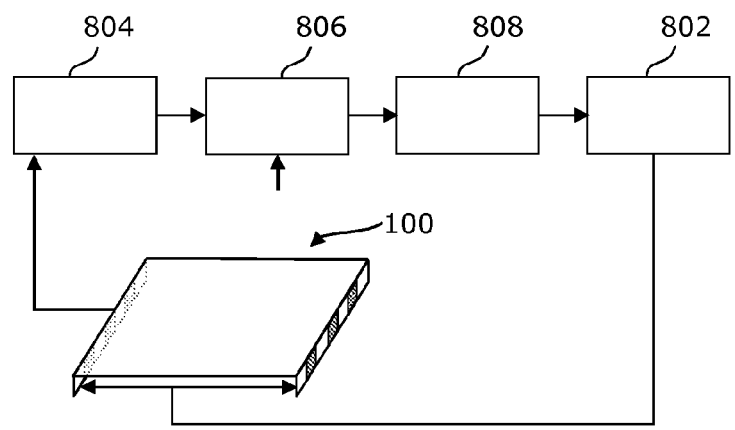
FIG. 8 is a diagrammatic representation of an embodiment example of a complete interface according to the invention.

FIG. 8 is a diagrammatic representation of an operation of a touch interface according to the invention.

The touch interface 800 represented in FIG. 8 comprises a supply module 802 making it possible to supply the piezoelectric layers of the interface, as a non-limitative example the interface 100. The interface 800 also comprises a sensor 804 of position, of speed and/or of acceleration of the finger of a user or of a pointer placed on the contact surface 102. The one or more items of data picked up by the sensor 804 is/are provided to a module 806 performing a space-time conversion of these data as a function of a setting, for example the period of the texture that it is desired to simulate. The result of the calculation is supplied to a module 808 which provides a pressure, frequency or phase setting with the supply module 802 which supplies the piezoelectric layers with electric voltage, in order to modulate the "Squeeze film" effect, the texture and/or the orientation of texture, and more generally to modulate the touch effect created.

Figure 9:
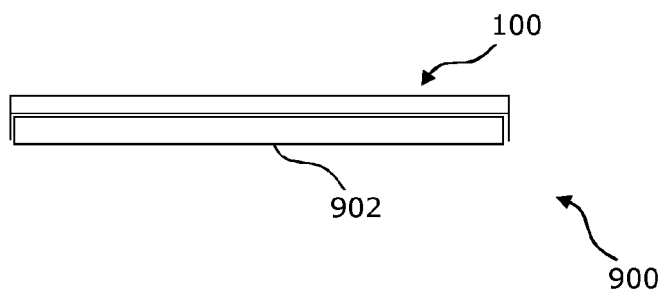
FIG. 9 is a diagrammatic representation of a screen according to the invention.

FIG. 9 is a diagrammatic representation of a display screen 900 according to the invention.

The display screen 900 comprises a touch interface according to the invention, as a non-limitative example the interface 100 and a display means 902 such as an LCD screen.

Of course, the invention is not limited to the examples detailed above.

The invention claimed is:

1. A touch interface comprising:
   a contact surface and means of vibrating said contact surface provided for generating stationary waves in said contact surface:
   said contact surface comprises at least one transparent portion producing an observation surface through said touch interface, and
   said vibration means comprise at least one rigid piezoelectric layer, firmly fixed to said contact surface and arranged on the periphery of said transparent portion; and
   said at least one rigid piezoelectric layer fixed to said contact surface so as to excite said contact surface on a line of at least two nodes of the stationary waves, and to transmit a torque to said contact surface to generate the stationary waves;
   wherein said at least one piezoelectric layer is arranged along a plane non parallel to the contact surface.

2. An interface according to claim 1, wherein at least one piezoelectric layer is arranged along a plane having an angle comprised between 45 degree and 90 degree with respect to the contact surface.

3. An interface according to claim 1, wherein at least one piezoelectric layer is arranged along a plane perpendicular to the contact surface.

4. An interface according to claim 1, comprising several rigid piezoelectric layers, firmly attached to said contact surface, at least two piezoelectric layers being arranged on the same side of the contact surface.

5. An interface according to claim 1, comprising several rigid piezoelectric layers, firmly attached to said contact surface, at least two layers being arranged on one side and on the other side of the contact surface.

6. An interface according to claim 1, wherein:
the contact surface is produced by a plate, called a contact plate, and
at least one piezoelectric layer comprises a rigid plate, called a support plate; and
said at least one support plate is arranged on the slice of said contact plate.

7. An interface according to claim 1, wherein:
the contact surface is produced by a plate, called a contact plate, and
at least one piezoelectric layer comprises a rigid plate, called a support plate; and
said at least one support plate is arranged on said contact plate by one of its edges.

8. An interface according to claim 7, wherein the at least one support plate is arranged on the contact plate so that said support plate projects towards only one side of the contact plate.

9. An interface according to claim 8, wherein at least one support plate is made from copper or an alloy based on copper.

10. An interface according to claim 1, wherein the contact surface has a parallelepiped shape and two piezoelectric layers are arranged on two opposite sides of said parallelepiped shape.

11. An interface according to claim 1, wherein at least one piezoelectric layer comprises a row of at least two piezoelectric cells.

12. An interface according to claim 1, wherein the contact surface is made from transparent glass, rigid plastic, polycarbonate, Plexiglas, or any combination of at least two of these materials.

13. An interface according to claim 1, wherein the means of vibrating the surface comprise means of electrical supply connected to each of said piezoelectric layers.

14. An interface according to claim 1, further comprising means for picking up a position, a speed and/or an acceleration of a finger of a user or of a pointer or any combination of at least two of these variables.

15. An interface according to claim 14, further comprising means for controlling and varying an amplitude, a phase and/or a frequency of the electrical supply delivered by the electrical supply means or any combination of at least two of these variables.

16. A touch display screen for an electronic device comprising a touch interface according to claim 1 and a graphical display screen visible through the transparent portion.

17. An electronic device comprising a touch display screen according to claim 16.

18. An interface according to claim 1, wherein the at least one rigid piezoelectric layer is attached to said contact surface on a line of nodes that are situated on an edge of said contact surface.

19. An interface according to claim 1, wherein said at least one rigid piezoelectric layer is attached to said contact surface on a line of nodes that are not situated on an edge of said contact surface.

* * * * *

UNITED STATES PATENT AND TRADEMARK OFFICE
CERTIFICATE OF CORRECTION

PATENT NO.        : 9,547,367 B2
APPLICATION NO.   : 14/116479
DATED             : January 17, 2017
INVENTOR(S)       : Giraud et al.

It is certified that error appears in the above-identified patent and that said Letters Patent is hereby corrected as shown below:

On the Title Page

Column 2,
Abstract, Line 1 reads "The The invention relates to a" and should read -- The invention relates to a --.

In the Specification

Column 1,
Lines 27-30 read "A first category of ... such as the touch interface described in ... filed by the Applicant are known" and should read -- A first category of ... such as the touch interface described in ... filed by the Applicant is known --.

Column 2,
Lines 9-11 read "piezoelectric layer is arranged in a plane non parallel to the contact surface, i.e. having a non zero angle with the contact surface" and should read -- piezoelectric layer is arranged in a plane non-parallel to the contact surface, i.e. having a non-zero angle with the contact surface --.

Column 2,
Line 14 reads "piezoelectric layer is arranged in a plane non parallel to the" and should read -- piezoelectric layer is arranged in a plane non-parallel to the --.

Column 2,
Lines 46-47 read "surface, each being arranged in one or more planes non parallel to the contact surface" and should read -- surface, each being arranged in one or more planes non-parallel to the contact surface --.

Column 4,
Line 32 reads "In the non limitative examples" and should read -- In the non-limitative examples --.

Signed and Sealed this
Seventh Day of March, 2017

Michelle K. Lee
*Director of the United States Patent and Trademark Office*

CERTIFICATE OF CORRECTION (continued)
U.S. Pat. No. 9,547,367 B2

Column 5,
Line 17 reads "In the non limitative examples" and should read -- In the non-limitative examples --.

In the Claims

Claim 1,
Column 6, Line 53 reads "said contact surface:" and should read -- said contact surface; --.

Claim 1,
Column 6, Line 56 reads "touch interface," and should read -- touch interface; --.

Claim 1,
Column 6, Line 67 reads "along a plane non parallel to the contact surface" and should read -- along a plane non-parallel to the contact surface --.

Claim 2,
Column 7, Line 3 reads "comprised between 45 degree and 90 degree with respect to" and should read -- comprised between 45 degrees and 90 degrees with respect to --.

Claim 6,
Column 7, Line 21 reads "said at least one support plate is arranged on the slice of" and should read -- said at least one support plate is arranged on the edge of --.